United States Patent
Yang et al.

(10) Patent No.: US 10,158,705 B2
(45) Date of Patent: Dec. 18, 2018

(54) MIGRATION OF HOSTS

(71) Applicant: HEWLETT PACKARD ENTERPRISE DEVELOPMENT LP, Houston, TX (US)

(72) Inventors: Bihui Yang, Beijing (CN); Hai Wang, Beijing (CN); Wei Wang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 123 days.

(21) Appl. No.: 15/503,974

(22) PCT Filed: Aug. 14, 2015

(86) PCT No.: PCT/CN2015/086989
§ 371 (c)(1),
(2) Date: Feb. 14, 2017

(87) PCT Pub. No.: WO2016/023518
PCT Pub. Date: Feb. 18, 2016

(65) Prior Publication Data
US 2017/0279884 A1 Sep. 28, 2017

(30) Foreign Application Priority Data
Aug. 14, 2014 (CN) .......................... 2014 1 0401101

(51) Int. Cl.
*G06F 15/16* (2006.01)
*H04L 29/08* (2006.01)
(Continued)

(52) U.S. Cl.
CPC ........ *H04L 67/1034* (2013.01); *H04L 61/103* (2013.01); *H04L 67/101* (2013.01);
(Continued)

(58) Field of Classification Search
CPC ............ H04L 67/1034; H04L 67/1002; H04L 67/101; H04L 67/42; H04L 61/103; H04L 43/0811
USPC ......................................... 709/220, 223, 230
See application file for complete search history.

(56) References Cited

U.S. PATENT DOCUMENTS

2014/0165063 A1 * 6/2014 Shiva .................. G06F 9/45533
718/1
2015/0372867 A1 * 12/2015 Amann ................. H04L 41/082
709/221
(Continued)

FOREIGN PATENT DOCUMENTS

| CN | 103686883 A | 3/2014 |
|---|---|---|
| CN | 103763121 A | 4/2014 |

(Continued)

OTHER PUBLICATIONS

"OpenFlow Switch Specification," Sep. 6, 2012, pp. 1-128, Version 1.3.1 (Wire Protocol 0x04), ONF TS-007, Open Networking Foundation.

(Continued)

*Primary Examiner* — Michael Won
(74) *Attorney, Agent, or Firm* — Hewlett Packard Enterprise Patent Department

(57) ABSTRACT

When monitoring that a host migrated, a software defined network (SDN) controller may actively detect a port located by the host. Besides, when detecting the port located by the host, the SDN controller may bind the host to the port where the host is located, so as to limit migration of the host. When not detecting a port located by the host, the SDN controller may also block packets from the host.

12 Claims, 5 Drawing Sheets

(51) Int. Cl.
*H04L 29/12* (2006.01)
*H04L 12/931* (2013.01)
*H04L 12/26* (2006.01)
*H04L 29/06* (2006.01)
*H04L 29/14* (2006.01)

(52) U.S. Cl.
CPC ...... *H04L 67/1002* (2013.01); *H04L 43/0811* (2013.01); *H04L 49/70* (2013.01); *H04L 67/42* (2013.01); *H04L 69/40* (2013.01)

(56) References Cited

U.S. PATENT DOCUMENTS

| 2017/0279884 | A1* | 9/2017 | Yang | H04L 61/103 |
| 2018/0091591 | A1* | 3/2018 | Puri | H04L 67/1095 |
| 2018/0109471 | A1* | 4/2018 | Chang | H04L 49/70 |
| 2018/0139272 | A1* | 5/2018 | Puri | G06F 9/5088 |
| 2018/0159781 | A1* | 6/2018 | Mehta | H04L 47/22 |

FOREIGN PATENT DOCUMENTS

| CN | 103827823 A | 5/2014 |
| CN | 103973676 A | 8/2014 |
| WO | WO-2010127365 A1 | 11/2010 |
| WO | WO-2012171216 A1 | 12/2012 |
| WO | WO-2014082493 A1 | 6/2014 |

OTHER PUBLICATIONS

International Search Report and Written Opinion, International Application No. PCT/CN2015/086989, dated Nov. 19, 2015, pp. 1-9, SIPO.

\* cited by examiner

MIGRATION OF HOSTS

BACKGROUND

Control plane and data plane of a network device may be separated from each other in a software defined network (SDN) structure, so as to flexibly control network flow. Correspondingly, an SDN network may consist of an SDN network device (such as a switch device) and an SDN controller, which are connected with each other through an SDN protocol channel.

As an example of the SDN standard, OpenFlow has been increasingly approved by market. An OpenFlow controller and an OpenFlow switch device may communicate with each other through an OpenFlow channel. The OpenFlow controller may generate a flow table and issue the flow table to the OpenFlow switch device, based on a user-configured or dynamically running protocol. And then, the OpenFlow switch device may process packets, based on the flow table issued by the OpenFlow controller.

Sometimes, OpenFlow switch devices devices at the edge of the SDN network may be connected with some ordinary switch devices, which do not employ the OpenFlow technologies. The ordinary switch devices may operate according to a regular layer two forwarding scheme, rather than according to SDN. Hosts of such ordinary switch devices, are servers, client devices or virtual machines (VMs) which access the network through the ordinary switch device. For example, a host may be a server, client device or a virtual machine on a server connected to the ordinary switch device.

BRIEF DESCRIPTIONS OF THE DRAWINGS

DETAILED DESCRIPTIONS

In a SDN network, a host may access the network through a port of a network access device such as a switch. The network access device for example be an SDN switch or a non-SDN switch. A host may change the port through which it accesses the network. In the context of this disclosure the terms "migration of a host" or "migration event of a host" refer to a host changing the port through which it accesses the SDN network.

For example, if it is a physical device, the host may be unplugged from one port and plugged into another port of the same switch or plugged into a port of another switch which lead to the physical device changing the port through which it accesses the SDN network. If it is a virtual machine the virtual machine may access the network through a connection between a physical server which hosts the virtual machine and a port of a switch which the physical server is connected to. The virtual machine may vary the port through which it accesses the SDN network by connecting through a different output port of the server or migrating to a different server which lead to the VM changing the port through which it accesses the SDN network. Migration of a host may be due to lack of CPU resources, memory or storage space, or being attacked by a user through false packet with the same MAC address and IP address of the host.

In an example, a SDN controller may monitor migration of hosts and detect when a host migrates frequently. In response to detecting that a host migrates frequently, the SDN controller may actively detect a port located by the host. In the context of this disclosure "a port located by the host" means a port through which the host accesses the SDN network.

When detecting a port located by the host, the SDN controller may bind the host to the port located by the host, so as to limit migration of the host.

However, if not able to detect a port located by the host, the SDN controller may block any packet coming from the host.

Thus, the SDN controller may limit migration of a host or block packets of the host, so as to control interference to the SDN controller resulting from the host's migration. This approach may help to avoid the following scenarios. If a host is allowed to migrate frequently or continuously, then this may cause the SDN controller to repeatedly issue a flow table to an SDN switch device. As a result, normal flows may not be responded to in a timely fashion, as the SDN controller may be busy continuously issuing flow tables. Thus, the above technique of limiting migration of a host may help to improve the reliability of the SDN controller.

In the present disclosure, the SDN controller and the SDN switch device may be respectively the OpenFlow controller and the OpenFlow switch device as an example.

Figure 1:
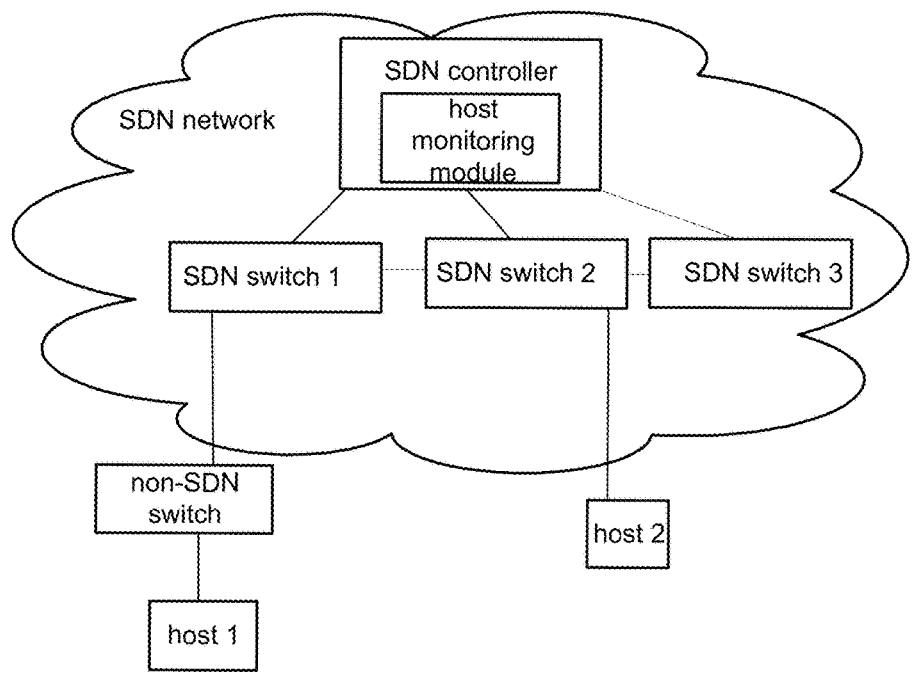
FIG. 1 is a network scene where a method for controlling migration of a host provided by the present disclosure may be applied.

FIG. 1 shows an example network, in which a method for controlling migration of a host provided by an example of the present disclosure may be applied. As shown in FIG. 1, a SDN network may include a SDN controller and three SDN switches, which are respectively SDN switch 1, SDN switch 2 and SDN switch 3. It should be noted that, number of the SDN switches are not limited to three. In an example, the SDN controller may include a host monitoring module, functions thereof will be described in the following. The SDN controller may be respectively connected to each of the three SDN switches. And the three SDN switches may be connected with each other. In FIG. 1, a host 1 is connected to and accesses a non-SDN switch which may be connected to SDN switch 1. In this case the host 1 is said to access the SDN through SDN switch 1. Host 2 may be connected to SDN switch 2. Subsequently, when CPU, or memory, or storage space of host 2 is not sufficient for services thereof, or when being attached by a user employing a false packet with the same MAC address and IP address of host 2, host 2 may migrate between SDN switch 2 and SDN switch 3. For example, host 2 may also access SDN switch 2 through different ports, e.g., port 1 and port 2 (which are not shown in FIG. 1), and host 2 may also migrate between port 1 and port 2 of SDN switch 2. If the host is a physical server it may migrate by being physically connected to a different SDN switch. If the host is a VM it may migrate by changing the port through which it connects to the SDN network. For instance if host 2 is a VM hosted by a physical server which is connected to a port 1 and port 2 of SDN switch 1, then the VM may migrate between ports 1 and 2 of SDN switch 1 without moving to a different physical server. The migration may be accomplished at the hypervisor layer of the server or by updating a forwarding table of a virtual switch inside the server etc. Likewise, if the physical server is connected to both SDN switch 2 and SDN switch 3, the VM may migrate between the two SDN switches in a similar manner. If the host 2 is a VM on a first server connected to SDN switch 2, but not connected to SDN switch 3, then the VM may migrate to a port of SDN switch 3 by moving to a second server connected to SDN switch 3.

Figure 2:
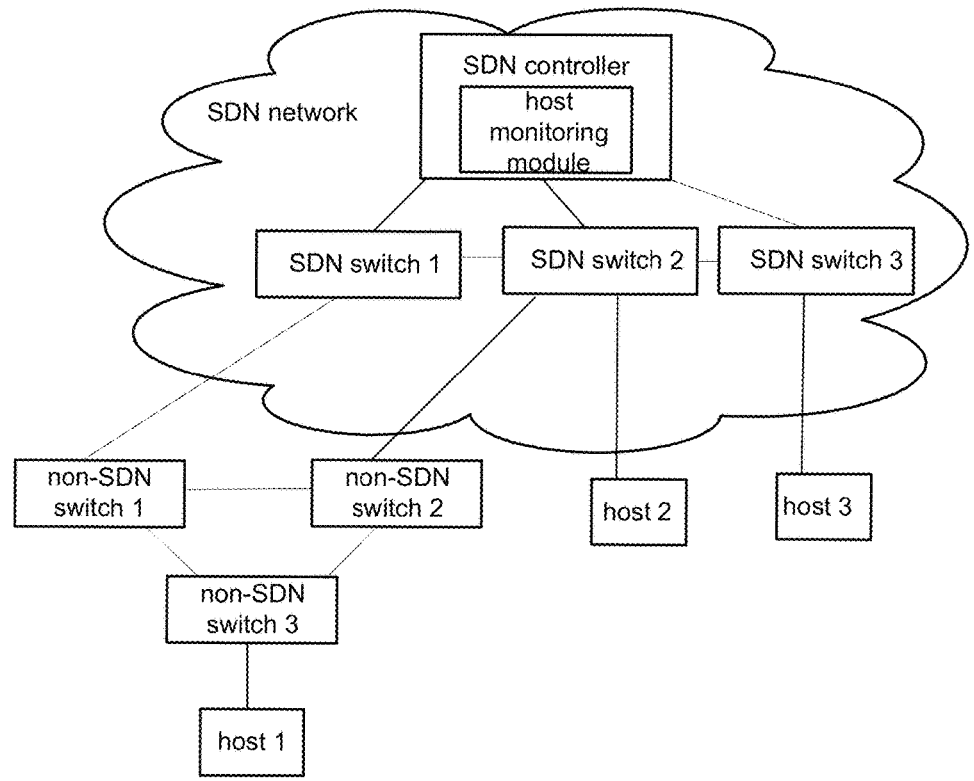
FIG. 2 is another network scene where a method for controlling migration of a host provided by the present disclosure may be applied.

FIG. 2 is another example of a network, where a method for controlling migration of a host provided by an example of the present disclosure may be applied. In FIG. 2, the SDN network may still include a SDN controller and three SDN switches similar to that in FIG. 1, which will not be repeated here. There are three non-SDN switches, e.g., non-SDN switch 1, non-SDN switch 2 and non-SDN switch 3, which are connected with each other. Non-SDN switches 1 and 2 are respectively connected with SDN switches 1 and 2. Host 2 accesses SDN switch 2. And host 3 accesses SDN switches 3.

For example, a loop may be generated among the foregoing three non-SDN switches in the example shown in FIG. 2 in some cases. Host 1 accessing non-SDN switch 3 may then migrate between SDN switch 1 and SDN switch 2. Then host 1 may access the SDN network through a port of SDN switch 1 and late migrate to access the SDN network through a port of SDN switch 2. In both cases the host 1 may still be connected to the non-SDN switch 3, but the port through which it accesses the SDN network changes. For example, if the host 1 accesses the SDN network via non-SDN switch 3, non-SDN switch 1 and SDN switch 1, and later changes to access the SDN network via non-SDN switch 3, non-SDN switch 2 and SDN switch 2, the host 1 is said to migrate from a port of SDN switch 1 to a port of SDN switch 2.

Figure 3:
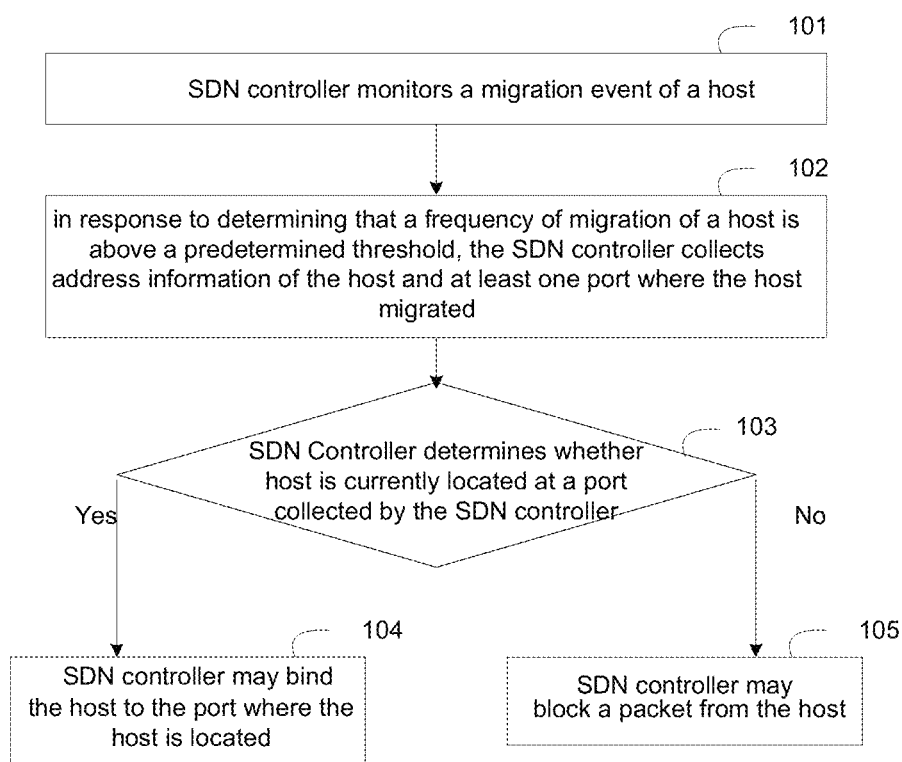
FIG. 3 is a flowchart illustrating a method for controlling migration of a host, in accordance with an example of the present disclosure.

Based on foregoing active detection mechanism of the SDN controller and network scene provided by FIG. 1 and FIG. 2, an example provides a method for controlling migration of a host. With reference to FIG. 3, the method may include the following blocks.

In block 101, a SDN controller may monitor a migration event of each host, so as to monitor whether migration number of each host within a predetermined period of time (e.g., 1 minute) achieves a migration number threshold (e.g., at least three times). "Migration number" means a number of times the host migrated within a predetermined period of time. The "predetermined period of time" may also be referred to as a "preset unit duration". The phrase "achieves a migration number threshold" means that the number of migrations equals to or exceeds a predetermined threshold for the allowable number of migrations in the predetermined period of time.

In block 102, in response to determining that a frequency of migration of a host is above a predetermined threshold, the SDN controller may collect address information of the host, and at least one port where the host migrated. In the context of this disclosure "a port where the host migrated" means either a port which the host migrated from or a port which the host migrated to. Frequency of migration can be explained as "number of times which the host migrates in a predetermined period of time".

In an example, the address information of the host, which is collected by the SDN controller in the block, may include the media access control (MAC) address and the Internet protocol (IP) address of the host.

When monitoring that migration number of any host within the unit duration achieves the migration number threshold, the SDN controller may further issue a warning prompt.

In addition, the SDN controller may collect all the ports where the host migrated within the unit duration, the number of which is n. Alternatively, the SDN controller may collect some of the ports where the host migrated; for instance based on a user-predefined number m of migration ports which are to be collected, in which m is a positive integer greater than or equal to 1, the SDN controller may collect m ports where the host migrated within the unit duration.

In block 103, the SDN controller may determine whether the host is currently located at a port collected by the SDN controller. In the context of this disclosure, the "host is located in a port" means that the host is connected to the SDN network through the port, such that the host accesses the SDN network through the port.

In an example, an address resolution protocol (ARP) packet may be employed when detecting whether a host is located in a port.

For each port, the SDN controller may firstly issue a packet-out message to a SDN switch device located by a port to be detected, to trigger the SDN switch device to transmit an ARP request packet through the port to be detected. The destination MAC address and destination IP address of the ARP request packet are respectively the collected MAC address and IP address of the host. In an example, both of the source MAC address and source IP address of the ARP request packet may be 0.

When the SDN controller receives an ARP response packet within a preset waiting duration (e.g., 10 seconds), which is reported by a packet-in message through the port, determine that the host is located in the port; otherwise, determine that the host is not located in the port.

In block 104, in response to determining that the host is located in a port collected by the SDN controller in block 102, the SDN controller binds the host to the port where the host is located. In the context of this disclosure 'bind the host to a port" means that the host is not allowed to associate with or connect to the SDN network through other ports. For example the SDN controller may issue flow tables or updates to flow tables to SDN switches, so as to prevent the host from connecting to the SDN network through another port.

In block 105, in response to detecting that the host is not located at a port collected by the SDN controller in block 102, the SDN controller blocks a packet from the host. For example, the SDN controller may issue updates to flow tables of SDN switches, so that the SDN switches drop packets from the host, or drop packets from the host unless the host is located at a port collected by the SDN controller in block 102. In an example, blocking of the packet may be implemented by using a spanning tree protocol (STP) block.

Until now, the foregoing flow may be terminated.

In an example, the binding executed in block 104 and the blocking executed in block 105 may be temporary, instead of being permanent.

Figure 4:
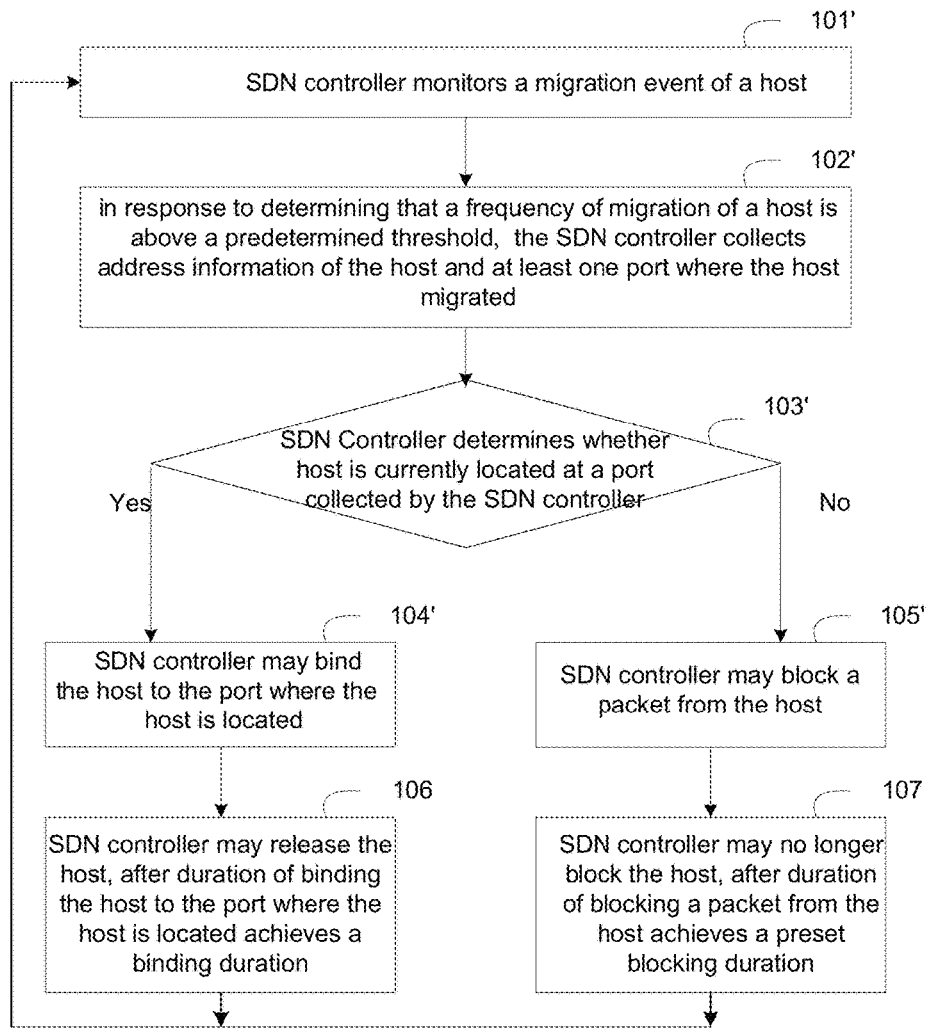
FIG. 4 is a flowchart illustrating a method for controlling migration of a host, in accordance with another example of the present disclosure.
Figure 5:
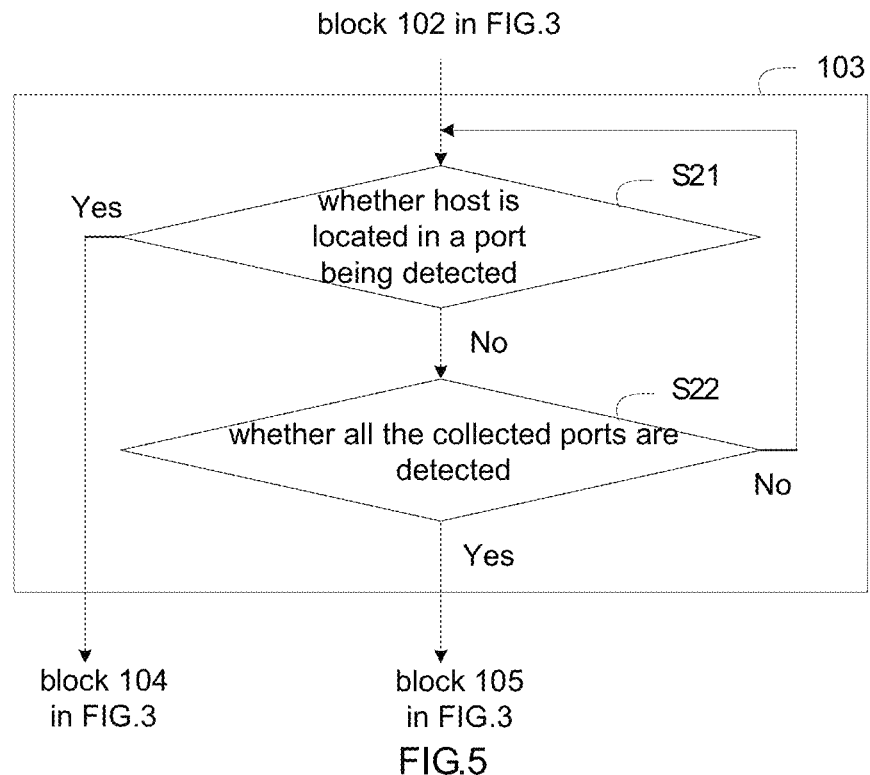
FIG. 5 is a flowchart illustrating a method for detecting multiple ports, in accordance with the method shown in FIG. 3.

Correspondingly, FIG. 4 is a flowchart illustrating a method for controlling migration of a host, in accordance with another example of the present disclosure. Blocks 101' to 105' in FIG. 4 are respectively the same as blocks 101 to 105 in FIG. 3, which will not be repeated here.

As shown in FIG. 4, proceed with block 106 after block 104', after duration of binding the host to the port located by the host achieves a preset binding duration (e.g., 10 minutes), the SDN controller may release the host.

Proceed with block 107 after block 105', when duration of blocking packets from the host achieves a preset blocking duration (e.g., 10 minutes), the SDN controller may no longer block the host.

After executing foregoing block 106 or 107, that is, return back to block 101' to continuously monitor, whether migration number of a host within the unit duration still achieves the migration number threshold. When the migration number of the host within the unit duration still achieves the migration number threshold, re-execute the flow starting from block 102'.

In addition, in an example, when number of ports where the host migrated, which is collected by the SDN controller, is greater than 1 (e.g., collect 3 ports where the host recently migrated), the SDN controller may initiate detection to these ports. Subsequently, loads of the SDN controller and port resources may increase suddenly. Thus, in the example, the SDN controller may detect these ports one by one.

In foregoing block 103 in FIG. 3, the SDN controller may start the detection from a port where the host recently migrated, based on a reverse sequence of the host's migration sequence, which may refer to FIGS.

In S21, a SDN controller may initiate detection to a host in a port being detected, to determine whether the host is located in the port being detected.

When detecting that the host is located in the port being detected, the SDN controller may trigger block 104 in FIG. 3.

When the SDN controller detects that the host is not located in the port being detected, jump to S22.

In S22, determine whether the port being detected is the last port to be detected, that is, determine whether all the collected ports are detected.

When determining that the port being detected is not the last port to be detected, return back to S21, the SDN controller may continuously detect a next port; otherwise, trigger block 105 in FIG. 3.

The foregoing describes an example of block 103 of FIG. 3, during which the SDN controller may detect multiple ports one by one.

In addition to foregoing active detection mechanism, an example further provides a port isolation mechanism.

The SDN controller may detect whether there is excessive number of hosts migrated on a same port, in other words, monitor whether there is a port, number of hosts migrated thereon achieves a migration host threshold. If yes, isolate packets received by the port. The isolation may be implemented by closing the port, blocking the port, or setting port state to be abnormal, etc. For a port, packet isolation of which has been implemented, a user may set a time of dis-isolation, or manually restore. Correspondingly, when monitoring that there is a port, number of hosts migrated thereon achieves the migration host threshold, the SDN controller may further issue a warning prompt. In the context of this disclosure, "a host migrated on a port" means either a host migrated from the port, or a host migrated to the port.

In addition, the port isolation mechanism may be used independently, or may be used combing with the active detection mechanism. When the port isolation mechanism and the active detection mechanism are used together, a migrated host, which is monitored on a port, may be detected on the port with the active detection mechanism. When detecting that the host is located in the port, bind the host to the port based on foregoing block 104. When detecting that the host is not located in the port based on foregoing block 105, make a statistics on number of hosts migrated on the port.

The foregoing is detailed descriptions about a method for controlling migration of a host. In an example, the method may be implemented by computer programs. Thus, the present disclosure also provides a corresponding device for controlling migration of a host.

Figure 6:
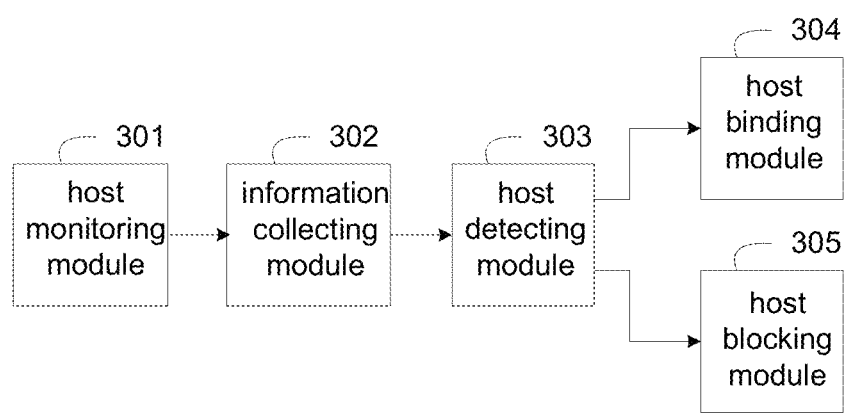
FIG. 6 is a schematic diagram illustrating structure of a device for controlling migration of a host, in accordance with an example of the present disclosure.

With reference to FIG. 6, in the example, the device for controlling migration of a host may include the following modules, which run in the SDN controller of the SDN structure.

A host monitoring module 301 is to monitor a migration event of a host, so as to monitor whether migration number of each host within a preset unit duration (e.g., 1 minute) achieves a migration number threshold (e.g., at least three times).

An information collecting module 302 is to collect address information of a host, and at least one port where the host migrated, in response to determining that a frequency of migration of the host is above a predetermined threshold.

In an example, the address information of host collected by the information collecting module 302 may include the MAC address and the IP address of the host. The foregoing device may also include a warning module (not shown in FIG. 6), which is to transmit a warning prompt, when monitoring that migration number of any host within the unit duration achieves the migration number threshold. In addition, the SDN controller may collect all the ports where the host migrated within the unit duration, number of which is n. Or, based on a user-predefined number m of migration ports to be collected, in which m is a positive integer greater than or equal to 1, the SDN controller may collect m ports where the host migrated within the unit duration.

A host detecting module 303 is to determine whether the host is currently located at a port collected.

In an example, the host detecting module 303 may be implemented by using an ARP packet. For each port, the host detecting module 303 may firstly issue a packet-out message to a SDN switch device, which is located by a port to be detected, to trigger the SDN switch device to transmit an ARP request packet through the port to be detected. The destination MAC address and destination IP address of the ARP request packet are respectively the collected MAC address and IP address of the host. Both of the source MAC address and source IP address of the ARP request packet are 0. When the host detecting module 303 receives an ARP response packet within a preset response waiting duration (e.g., 10 seconds), which is reported by a packet-in message through the port, determine that the host is located in the port; otherwise, determine that the host is not located in the port.

A host binding module 304 is to bind the host to the port where the host is located, in response to determining that the host is located in a port collected;

A host blocking module 305 is to block a packet from the host, in response to detecting that the host is not located at a port collected.

In addition, as mentioned in the foregoing method, binding and blocking of the host may be temporary, instead of permanent. Thus, as shown in FIG. 6, in the example, the device for controlling migration of a host may further include the following modules (not shown in FIG. 6), which may run in the SDN controller.

A binding release module is to release the host, when duration of binding the host to the port located by the host achieves a binding duration.

A blocking cancel module is to no longer block the host, when duration of blocking packets coming from the host achieves a blocking duration.

In an example, when there are at least two ports where the host migrated, which have been collected by the information collecting module 302, the host detecting module 303 may initialize detection to these ports. In an example, the host detecting module 303 may start detection from a port recently migrated, based on a reverse sequence of the host's migration sequence.

For each port being detected, when detecting that the host is located in the port being detected, the host detecting module 303 may trigger the host binding module 304 to work.

When detecting that the host is not located in the port being detected, and not all the collected ports are detected, the host detecting module 303 may detect a next port.

When detecting that the host is not located in the port being detected, and all the collected ports are detected, the host detecting module 303 may trigger the host blocking module 305 to work.

In addition to foregoing modules implementing the active detection mechanism as shown in FIG. 6, in the example, the device for controlling migration of a host may further include the following modules (not shown in FIG. 6), which may run in the SDN controller, so as to support implementation of the port isolation mechanism.

A port monitoring module is to monitor number of hosts migrated on each port.

A port isolating module is to isolate packets received by a port, when number of hosts migrated on the port achieves the migration host threshold.

Figure 7:
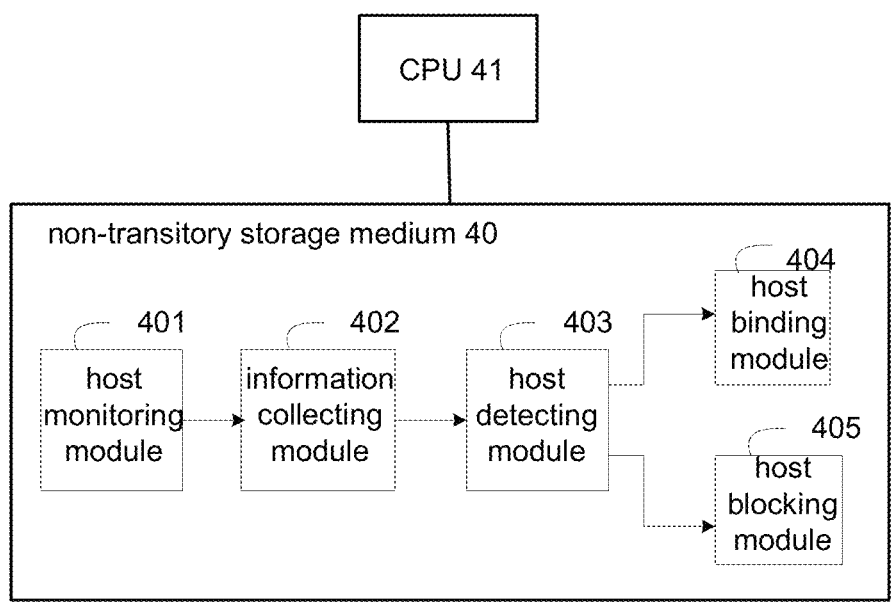
FIG. 7 is a schematic diagram illustrating another structure of a device for controlling migration of a host, in accordance with an example of the present disclosure.

With reference to FIG. 7, FIG. 7 is a schematic diagram illustrating hardware structure of an SDN controller, which is used for controlling migration of a host, in accordance with an example of the present disclosure. The SDN controller may be a SDN controller in the SDN structure. The SDN controller may include a non-transitory storage medium 40 and a central processing unit (CPU) 41.

The non-transitory storage medium 40 may store computer instructions, which may be executable by CPU 41.

CPU 41 is to read and execute the computer instructions stored in the non-transitory storage medium 40.

When running the foregoing computer instructions, the computer instructions may implement functions of the host monitoring module 301, information collecting module 302, host detecting module 303, host binding module 304, host blocking module 305, binding release module, blocking cancel module, port monitoring module and port isolating module Thus, it can be seen that, based on the present disclosure, when monitoring that a host migrated frequently, the SDN controller may actively detect a port where the host is located. Besides, when detecting the port located by the host, the SDN controller may bind the host to the port, to limit migration of the host. When not detecting a port located by the host, the SDN controller may also block packets from the host. Thus, interference to the SDN controller resulted from host's migration may be controlled, by limiting host's migration or blocking host's packets. Subsequently, the following scenes may be avoided.

For example, under the circumstances that exterior of edge of the SDN structure is connected with ordinary switch devices, when broadcast storm occurs, or the ordinary switch devices are attacked by packets, a host accessed with an ordinary switch may frequently migrate among each port of the SDN switch device (different ports of a same SDN switch device, or ports of different SDN switch devices), to enable the SDN controller to repeatedly issue a flow table to an SDN switch device, accompanying with continuous migration of the host. Subsequently, normal flow may be not timely responded due to the busy SDN controller, which may lead to lower reliability of the SDN controller.

In addition, based on the present disclosure, when monitoring that there is an excessive number of hosts migrated on a port, the SDN controller may isolate packets received by the port. Thus, batch control may be performed to frequent migration of a host by taking a port as a unit. Subsequently, reliability of the SDN controller may be improved.

The invention claimed is:

1. A method for controlling migration of a host, comprising:
    monitoring, by a software defined network (SDN) controller, a migration event of a host;
    in response to determining that a frequency of migration of a host is above a predetermined threshold, collecting, by the SDN controller, address information of the host and at least one port where the host migrated;
    determining, by the SDN controller, whether the host is currently located at a port collected by the SDN controller;
    in response to determining that the host is located in a port collected by the SDN controller, binding, by the SDN controller, the host to the port where the host is located;
    in response to detecting that the host is not located at a port collected by the SDN controller, blocking, by the SDN controller, a packet from the host.

2. The method according to claim 1, further comprising:
    releasing, by the SDN controller, the host, when a duration of binding the host to the port where the host is located achieves a binding duration; and
    no longer blocking, by the SDN controller, the host, when a duration of blocking the packet from the host achieves a blocking duration.

3. The method according to claim 1, wherein the collected address information of the host comprises a media access control (MAC) address and an Internet protocol (IP) address.

4. The method according to claim 3, wherein determining by the SDN controller whether the host is currently located at the port collected by the SDN controller comprises:
    issuing, by the SDN controller, a packet-out message to an SDN switch device located by the port, to trigger the SDN switch device to transmit an address resolution protocol (ARP) request packet through the port, wherein destination MAC address and destination IP address of the ARP request packet are respectively the collected MAC address and IP address of the host, both of source MAC address and source IP address of the ARP request packet are 0;
    in response to receiving an ARP response packet within a response waiting duration, which is reported by a packet-in message through the port, determining, by the SDN controller, the host is located at the port collected by the SDN controller; otherwise, determining that the host is not located at the port collected by the SDN controller.

5. The method according to claim 1, wherein determining by the SDN controller whether the host is currently located at the port collected by the SDN controller comprises:
    when there are at least two collected ports where the host migrated, detecting, by the SDN controller, from a port where the host recently migrated, based on a reverse sequence of a migration sequence.

6. The method according to claim 1, further comprising:
monitoring, by the SDN controller, number of hosts, which migrate on each port of the SDN switch device;
isolating, by the SDN controller, a packet received by a port, when the number of hosts migrated on the port of the SDN switch device exceeds a migration host threshold.

7. A software defined network (SDN) controller, wherein the SDN controller comprises a processor and a non-transitory storage medium;
the non-transitory storage medium is to store computer instructions, which are executable by the processor, when being executed by the processor, the computer instructions indicate to:
monitor a migration event of a host;
in response to determining that a frequency of migration of a host is above a predetermined threshold, collect address information of the host and at least one port where the host migrated;
determine whether the host is currently located at a port collected;
in response to determining that the host is located in a port collected, bind the host to the port where the host is located;
in response to detecting that the host is not located at a port collected, block a packet from the host.

8. The device according to claim 7, wherein when being executed by the processor, the computer instructions further indicate to:
release the host, when a duration of binding the host to the port located by the host achieves a binding duration; and,
no longer block the packet from the host, after a duration of blocking the packet from the host achieves a blocking duration.

9. The device according to claim 7, wherein when being executed by the processor, the computer instructions further indicate to collect the media access control (MAC) address and the Internet protocol (IP) address of the host.

10. The device according to claim 9, wherein when being executed by the processor, the computer instructions further indicate to:
issue a packet-out message to an SDN switch device located by the port, to trigger the SDN switch device to transmit an address resolution protocol (ARP) request packet through the port, wherein destination MAC address and destination IP address of the ARP request packet are respectively the collected MAC address and IP address of the host, both of source MAC address and source IP address of the ARP request packet are 0;
determine that the host is located at the port collected by the SDN controller, in response to receiving an ARP response packet within a response waiting duration, which is reported by a packet-in message through the port; otherwise, determine that the host is not located at the port collected by the SDN controller.

11. The device according to claim 7, wherein when being executed by the processor, the computer instructions further indicate to:
detect from a port where the host recently migrated, based on a reverse sequence of a migration sequence, when there are at least two collected ports where the host migrated;
bind the host to the port located by the host, when detecting that the host is located in the port being detected;
continuously detect whether the host is located in a next port, when detecting that the host is not located in the port being detected, and not all the collected ports are detected; and,
block the packet from the host, when detecting that the host is not located in the port being detected, and all the collected ports are detected.

12. The device according to claim 7, wherein when being executed by the processor, the computer instructions further indicate to:
monitor number of hosts migrated on each port; and
isolate a packet received by a port, when the number of hosts migrated on the port exceeds a migration host threshold.

* * * * *